United States Patent

[11] 3,536,165

| [72] | Inventor | Rene A. Desjardins<br>Ridley Park, Pennsylvania |
| --- | --- | --- |
| [21] | Appl. No. | 694,573 |
| [22] | Filed | Dec. 29, 1967 |
| [45] | Patented | Oct. 27, 1970 |
| [73] | Assignee | The Boeing Company<br>Seattle, Washington<br>a corporation of Delaware |

[54] VIBRATION ABSORBER TUNER
8 Claims, 5 Drawing Figs.

[52] U.S. Cl. .................................................. 188/1,
   188/103
[51] Int. Cl. .................................................. F16d 63/00
[50] Field of Search ...................................... 188/1(B),
   103; 61/6(CK)

[56] References Cited
UNITED STATES PATENTS

| 2,226,571 | 12/1940 | McGoldrick | 188/1(B)UX |
| 2,838,137 | 6/1958 | Wallerstein | 188/1(B)UX |
| 2,896,447 | 7/1959 | Phillips et al. | 188/1(B)UX |
| 2,964,272 | 12/1960 | Olson | 188/1(B)UX |
| 3,242,791 | 3/1966 | Smith | 188/1(B)UX |

*Primary Examiner*—Duane A. Reger
*Attorneys*—Robert J. McDonnell, Matthew P. Lynch and Albert W. Hilburger ABSTRACT: A dynamic vibration absorber has its frequency adjusted to be equal to the frequency of vibrations created by a body to which the absorber is attached. The absorber has movable masses pivotally connected thereto for changing the effective mass of the absorber; this changes the frequency of the absorber to make it equal to the frequency of the vibrations created by the body to which the absorber is attached.

Patented Oct. 27, 1970

3,536,165

INVENTOR
RENE A. DESJARDINS

BY Matthew P. Lynch

HIS ATTORNEY.

Patented Oct. 27, 1970 3,536,165

VIBRATION ABSORBER TUNER

When a dynamic vibration absorber has its natural frequency equal to the frequency of a vibration, the absorber will absorb the vibration. However, if the frequency of the vibration should not be equal to the natural frequency of the absorber, the vibration will not be absorbed; instead, two resonant periods will exist to produce a worse problem.

Since the natural frequency of a dynamic vibration absorber is equal to the square root of the ratio of the spring rate of the absorber to the mass of the absorber, a variation in either the spring rate or the mass will change the natural frequency of the absorber. Accordingly, it has been previously suggested to tune a dynamic vibration absorber so that the natural frequency of the absorber is adjusted to correspond with the frequency of the vibration, which it is desired to absorb. In the previously suggested tuning systems, the primary means for changing the natural frequency of the vibration absorber has been to change the spring rate.

It also has been previously suggested to change the effective mass of the absorber and the spring rate at the same time. In the latter suggested tuning system in which the effective mass and spring rate of the absorber was changed, additional movable masses were used and required springs to connect them to the main mass of the absorber. Thus, a change in the total mass of the absorber also resulted in a change in the spring rate at the same time when the mass was moved to certain positions.

As a result the system introduced a second frequency, which was a function of the square root of the ratio of the spring rate of the tuning mass attaching springs to the tuning mass. Thus, the previously suggested tuning system in which variable tuning masses were employed was not satisfactory.

The present invention satisfactorily overcomes the foregoing problems by employing a tuning device that does not require or cause any change in the spring rate of the vibration absorber. In the present invention, a tuning mechanism is employed to alter only the effective mass of the absorber without changing the spring rate of the absorber. Therefore, the present invention results in simple, efficient adjustment of the natural frequency of the absorber in accordance with changes in the frequency of the vibrations and permits determination of the natural frequency of the absorber.

In the previously suggested device for tuning the vibration absorber in which the spring rate was changed, the device required a substantially large area beyond that required for the absorber per se. Accordingly, the utilization of the tuning mechanism was further limited because of the relatively large envelope required.

The present invention satisfactorily overcomes the foregoing problem by providing a tuning device in which only a small additional area is required. This is accomplished through positioning the separate masses adjacent to the main mass and the support for the main mass.

The present invention contemplates pivotally connecting a plurality of separate members to the main mass, which is supported by springs and movable in response to the vibrations in the support structure to absorb the vibrations. The separate members also are connected through suitable linkage mechanism to each other and to the support means for the main mass. As a result, the separate members all move simultaneously.

By connecting the separate members to the support means for the main mass, the introduction of any additional spring rate from the connection of the separate members is eliminated. Accordingly, the separate members of the present invention only change the effective mass of the absorber and not its spring rate. Thus, simple and efficient adjustment of the natural frequency of the absorber is obtained.

Each of the separate members provides an effective mass, which is actually a force exerted on the main mass of the absorber. This force is produced from two different sources.

One of the forces is created by the product of the vertical component of the mass of the separate member and its linear acceleration; since the separate member is connected to the main mass of the absorber through the pivotal connection, the linear acceleration of the separate member is the same or a function of the linear acceleration of the main mass.

The other force is due to the mass moment of inertia of each of the separate members. Since the present invention contemplates connecting the separate members through a linkage mechanism to the support means for the main mass, there is a relative angular motion between the main mass and each of the separate members due to the linear motion of the main mass when the separate member is not vertically disposed with respect to its pivotal connection to the main mass.

This force is equal to the product of the mass moment of inertia of the separate member and the angular acceleration of the separate member about its pivotal connection to the main mass divided by the distance from the center of gravity of the separate member to its pivotal connection to the main mass. If the separate member is disposed vertically above its pivotal connection, the only vertical force exerted on the pivotal connection to the main mass during movement of the main mass would be the force created by the mass and its linear acceleration. In this vertical position of the separate member, there is no vertical component due to any angular acceleration.

If the separate member is disposed in a horizontal position, there is no vertical component of the mass of the separate member passing through the pivotal connection. As a result, if the separate member is disposed in a horizontal position, only the force created by the mass moment of inertia and the angular acceleration is produced at the pivotal connection to the main mass.

In any intermediate position between the vertical and horizontal positions, there is a combination of the two forces. Since it is desirable that the force produced by the linear acceleration be the controlling factor in determining the effective mass of the absorber rather than the force created by the angular acceleration of the separate member, the moment of inertia of each of the separate members should be kept as small as possible. Accordingly, each of the separate members is preferably selected as a solid cylinder or a sphere since these produce a low mass moment of inertia.

Additional reduction in the force, which is created by the mass moment of inertia, is obtained by maintaining a maximum distance, in accordance with the total envelope of the absorber including the tuning device of the present invention, between the center of gravity of the separate member and its pivotal connection to the main mass.

Accordingly, the effective mass of the absorber of the present invention is changed through changing the position of the separate masses. The primary effect is from the separate masses and the linear acceleration of the main mass with the secondary effect being due to the mass moment of inertia force.

An object of this invention is to provide a device for maintaining the frequency of the vibration absorber at the same frequency as the vibration that is to be absorbed through changing the effective mass of the absorber.

Another object of this invention is to provide a mechanism for automatically tuning a vibration absorber in response to changes in frequency of a vibration that is to be absorbed by the absorber.

Other objects of this invention will be readily perceived from the following description, claims, and drawings.

This invention relates to a tuning device for tuning a dynamic vibration absorber having a resiliently supported mass to absorb vibrations of varying frequencies. The tuning device includes means adapted to be connected to the support for the mass and to the mass to change only the effective mass of the absorber in accordance with changes in the frequency of the vibrations to be absorbed.

This invention also relates to a self-tuning vibration absorber adaptable to absorb vibrations of varying frequencies. The absorber has support means adapted to be secured to a vibration source and a vibration absorber mass, which includes a main mass and supplementary mass means. The main mass is resiliently supported on the support means for movement in one plane to absorb vibrations along that plane. Means connect the supplementary mass means to the main mass for movement therewith. The position of the supplementary mass means with respect to the main mass is changed by suitable means whereby the effective mass of the vibration absorber is changed. The changing means is secured to prevent movement thereof when the main mass moves in response to the vibration. The changing means positions the supplementary mass means with respect to the main mass so that the frequency of the vibration absorber is equal to the frequency of the vibrations to be absorbed.

This invention further relates to a method for tuning a dynamic vibration absorber, which has a resiliently supported mass, to the frequency of a vibration to be absorbed by the absorber. The method comprises sensing the difference in frequencies between the vibration and the natural frequency of the absorber and determining which of the frequencies is larger. After the determination has been made, the effective mass of the absorber is changed to vary the natural frequency of the absorber until it equals the frequency of the vibration.

The attached drawings illustrate preferred embodiments of the invention, in which.

Figure 1:
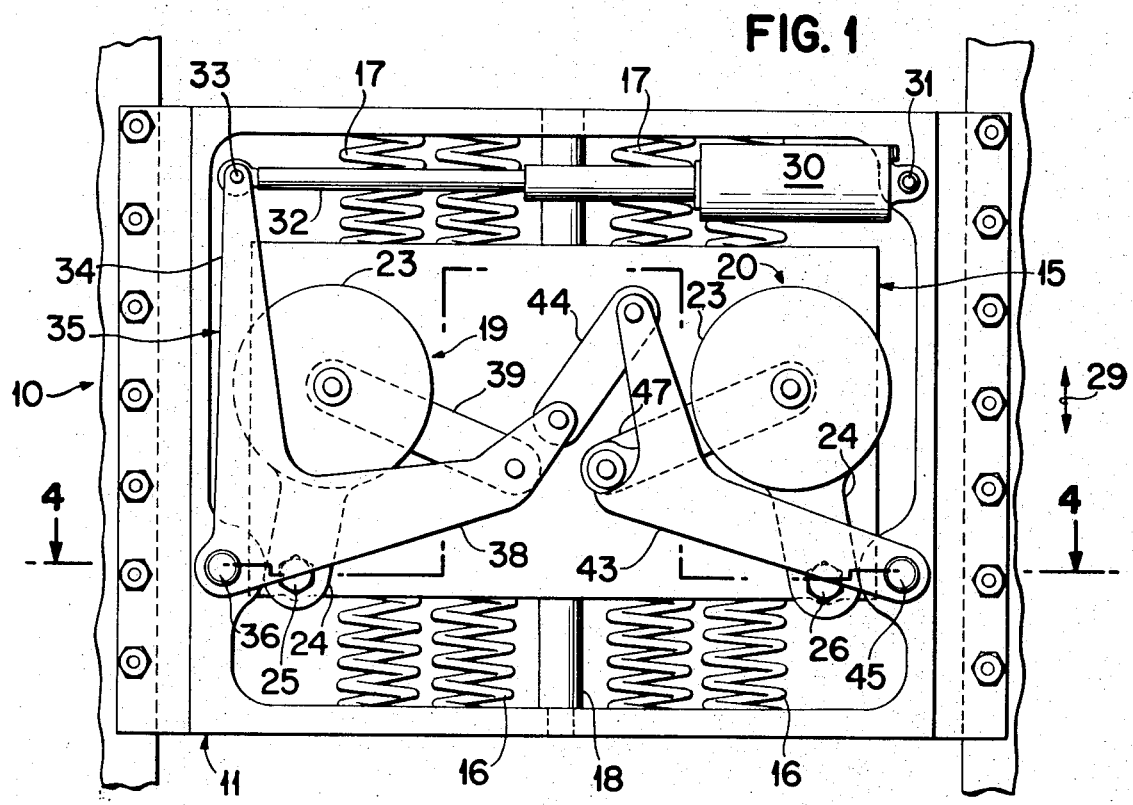
FIG. 1 is a front elevational view of the tuning device of the present invention being utilized with a dynamic vibration absorber.

Referring to the drawings and particularly FIG. 1, there is shown a body 10 that undergoes vibrations of varying frequency during operation. The body 10 may be an engine or a helicopter rotor support structure, for example. The body 10 has a dynamic vibration absorber secured thereto for absorbing the vibrations.

Figure 4:
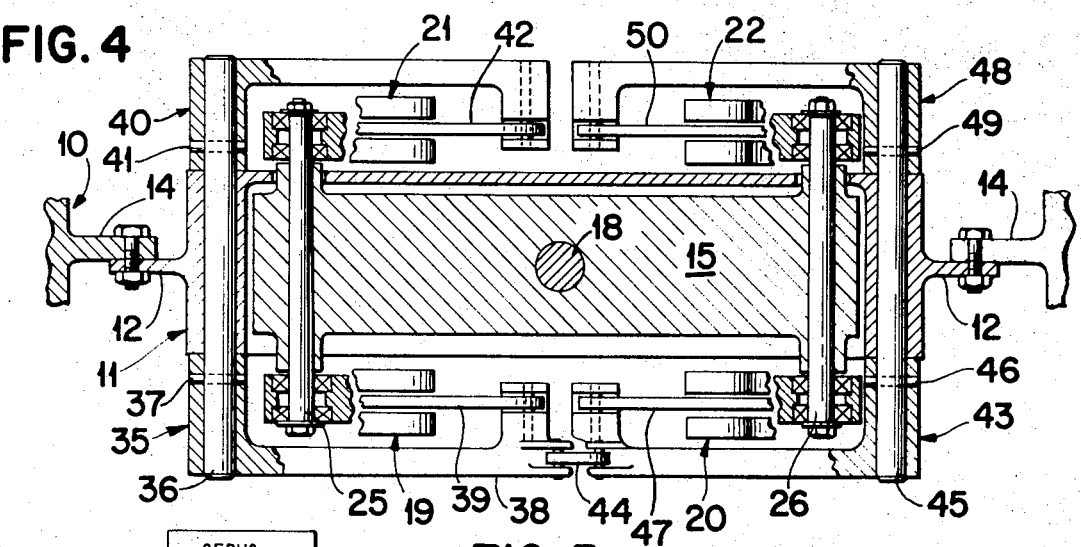
FIG. 4 is a sectional view, partly in plan, taken along line 4-4 of FIG. 1.

The vibration absorber includes a casing 11 secured on opposite sides to the body 10. As shown in FIG. 4, the casing 11 has flanges 12 extending from opposite sides thereof for attachment to flanges 14 on the body 10 by suitable means such as bolts and nuts.

The casing 11 has a first, main mass 15 resiliently supported therein. The mass 15 is supported within the casing 11 on one side by a plurality of coil springs 16 and on the opposite side by a plurality of coil springs 17.

The casing 11 has a rod or shaft 18 fixedly supported therein and slidably supporting the mass 15 thereon. Thus, the mass 15 may only move in both directions along the longitudinal axis of the rod 18.

The mass 15 has four members 19, 20, 21, and 22 pivotally mounted thereon and forming part of the total mass of the vibration absorber. The members 19—22 are simultaneously movable relative to the main mass 15 to vary the total effective mass of the vibration absorber.

Each of the members 19—22 comprises a mass portion 23 and a connecting portion 24. The mass 15 has studs 25 and 26 thereon for pivotally mounting the members 19—22 on the mass 15 by the connecting portion 24.

As shown in FIG. 4, the stud 25 has the members 19 and 21 connected to opposite ends thereof through the connecting portion 24. Likewise, the stud 26 has the members 20 and 22 disposed on opposite ends thereof through their respective connecting portions 24. The studs 25 and 26 extend outwardly through openings in the casing 11 so that the members 19—22 are disposed externally of the casing 11. Thus, with the members 19—22 disposed at the four lower or upper corners of the mass 15 in a symmetrical manner and movable simultaneously, all undesirable lateral force components and coupled outputs on the main mass 15 are cancelled out. Only the required vertical forces remain and are additive.

The dynamic vibration absorber will absorb vibrations of the body 10 in the directions of arrow 29 (FIG. 1) which is parallel to the longitudinal axis of the rod 18. The natural frequency of the absorber is the square root of the ratio of the spring rate of the absorber to the mass of the absorber. Thus, the coil springs 16 and 17 form the spring rate of the absorber, and the main mass 15 and the members 19—22 comprise the mass of the absorber.

Accordingly, when the vibrations of the body 10 are of the same frequency as the natural frequency of the vibration absorber, the vibrations of the body 10 in the directions of the arrow 29 will be effectively suppressed through being absorbed by the vibration absorber. It should be understood that the dynamic vibration absorber causes the body 10 to remain stationary. Thus, this type of vibration absorption should be carefully distinguished from vibration isolation through flexible mountings which are concerned with reduction in transmission of vibration from a vibrating body to its support.

If the frequency of the vibrations of the body 10 in the directions of the arrow 29 should cease to be the same as the natural frequency of the vibration absorber, the vibration absorber will no longer absorb the vibration. When this occurs, the tuning device or mechanism of the present invention will change the total effective mass of the vibration absorber by simultaneously moving the members 19—22 to cause the natural frequency of the absorber to again be equal or in tune with the vibrations of the body 10.

The actuating means for simultaneously moving the members 19—22 includes an actuator 30, which is pivotally mounted on the casing 11 by a pin 31. The actuator 30 has a reciprocally movable rod 32. The free end of the rod 32 is pivotally connected by pin 33 to one end of an arm 34 of a bellcrank 35. The bellcrank 35 is fixedly connected to a shaft 36, which is rotatably mounted in the casing 11, by a pin 37.

The bellcrank 35 has its other arm 38 connected by a link 39 to the member 19. The link 39 is pivotally connected to both the arm 38 and the member 19.

Figure 2:
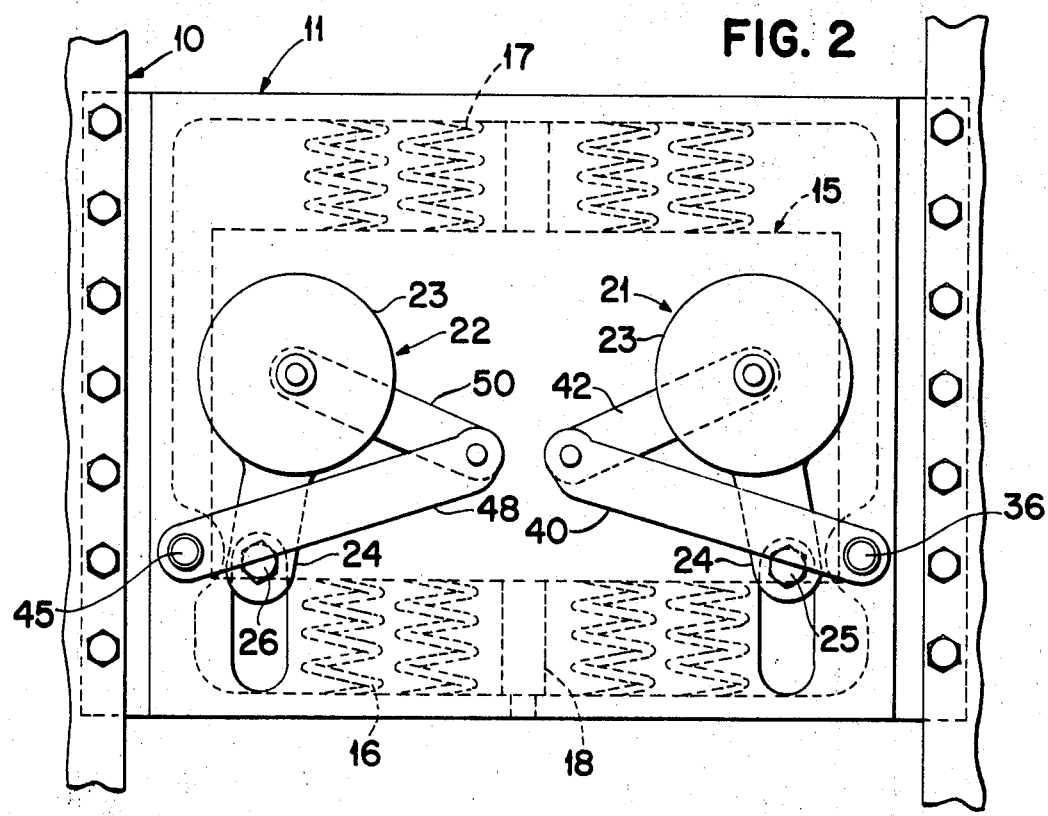
FIG. 2 is a rear elevational view of the structure of FIG. 1.

The shaft 36 has a lever 40 fixedly secured thereto by a pin 41. As shown in FIG. 2, the lever 40 is secured to the member 21 by a link 42, which is pivotally connected to both the member 21 and the lever 40. Accordingly, whenever there is rotation of the shaft 36 due to the bellcrank 35 being moved by the actuator 30, similar rotation of the lever 40 occurs. Thus, the members 19 and 21 are moved equal amounts in unison.

The bellcrank 35 also is connected to a lever 43 by a link 44. The link 44 has one end pivotally connected to one end of the arm 38 of the bellcrank 35 and its other end pivotally connected to an end of the lever 43.

The lever 43 is fixedly secured to a shaft 45, which is rotatably mounted in the casing 11, by a pin 46. The axis of the shaft 45 is the pivot axis for the lever 43 since they rotate together.

As shown in FIGS. 1 and 4, the lever 43 is connected to the member 20 by a link 47. Accordingly, the relationship between the bellcrank 35, the connecting link 44, and the lever 43 is such that an equal amount of pivoting occurs about the stud 26 by the member 20 as occurs about the stud 25 by the member 19 whenever the actuator 30 moves the rod 32.

The shaft 45 has a second lever 48 fixedly secured thereto by a pin 49. Thus, the lever 48 rotates about the axis of the shaft 45 whenever the lever 43 rotates about the axis of the shaft 45. This occurs whenever the actuator 30 moves the rod 32.

As shown in FIG. 2, the lever 48 has a link 50 pivotally connected thereto and to the member 22. Thus, the pivotal movement of the lever 48 is transmitted to the member 22 to cause it to rotate about the stud 26. The member 22 rotates about the stud 26 the same amount as the member 20 and in unison. Accordingly, the same amount of rotation is imparted to each of the members 19—22 about the studs 25 and 26 whenever the rod 32 is moved by the actuator 30. As previously mentioned, lateral outputs cancel each other out.

The actuator 30 must be capable of retaining the separate members 19—22 in their various adjusted positions. Accordingly, the actuator 30 is preferably a reversible electric motor with a gear train connected to the rod 32. This provides positive retention of the members 19—22 in their various adjusted positions. One suitable example of the actuator 30 is an actuator sold by Nash Control Company of Caldwell, New Jersey as Model AL132616-1. Of course, other suitable types of actuators may be employed.

Figure 3:
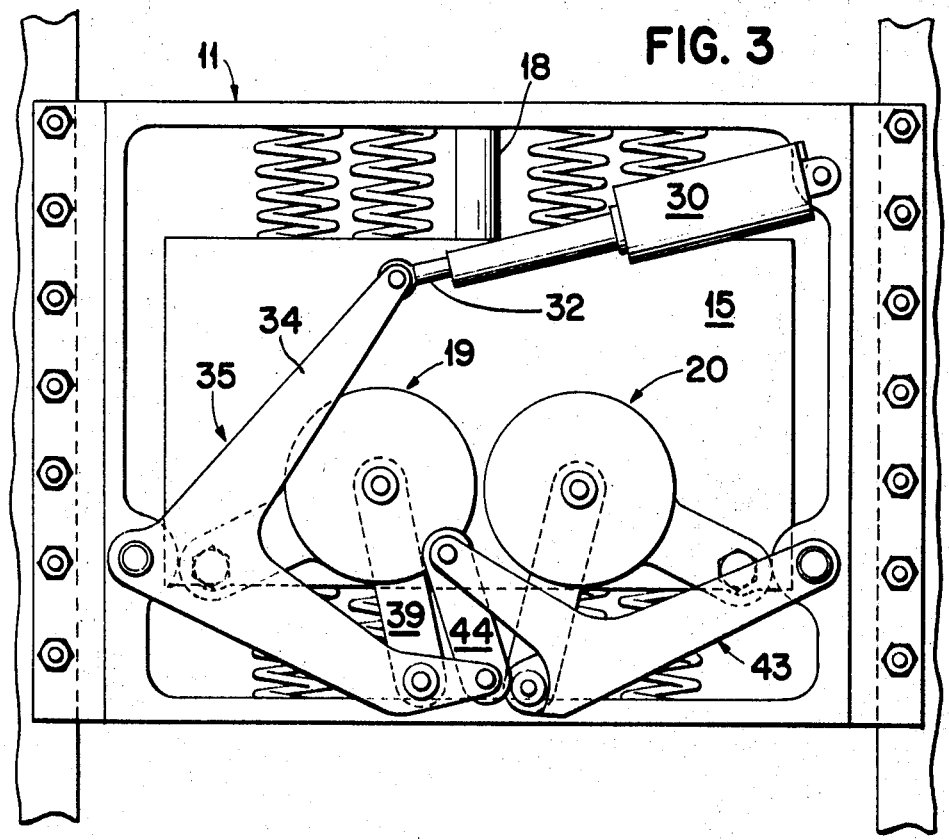
FIG. 3 is a front elevational view, similar to FIG. 1, showing the tuning device of the present invention in its substantially horizontal position.

Considering the operation of the tuning device of the present invention, the members 19—22 are shown in one of their extreme positions in FIGS. 1 and 2 while the members 19 and 20 are shown in the other of their extreme positions in FIG. 3. It should be understood that the members 21 and 22 would assume positions similar to those shown in FIG. 3 for the members 19 and 20 when the members 19 and 20 are in the positions of FIG. 3.

When the members 19—22 are disposed as shown in FIGS. 1 and 2, they provide the maximum effective mass for cooperation with the main mass 15. The members 19—22 and the mass 15 combine to produce the largest effective mass available from a vibration absorber using the tuning device of the present invention. Since this position produces the largest effective mass and the natural frequency of the absorber including the tuning device is inversely proportional to the square root of the total mass, an increase in the mass results in a decrease in the frequency. Accordingly, the lowest frequency of the vibrations from the body 10 that can be absorbed by the absorber is with the members 19—22 in the positions of FIGS. 1 and 2.

When the vibrations produced by the body 10 are above the lowest frequency, the actuator 30 must be activated to energize the motor of the actuator 30 in a direction to cause the rod 32 to be extended from the actuator 30. This results in all of the members 19—22 pivoting about the studs 25 and 26. As a result, the effective mass produced by each of the members 19—22 is reduced the same amount.

The effective absorber mass produced by each of the members 19—22 is due to a combination of the force created by the linear acceleration of the main mass 15 and a force created by the mass moment of inertia of each of the separate members 19—22. As shown in FIGS. 1 and 3, the members 19—22 are not movable to a complete vertical or horizontal position. If they were, then only the force due to linear acceleration would be effective in the vertical position and only the mass moment of inertia component would be effective in the horizontal position with the two combining in any of the intermediate positions. It should be understood that the members 19—22, if desired, could be moved to the complete vertical or horizontal positions. However, in the structure shown in FIGS. 1 and 3, it is desired that the area for the tuning device be kept as small as possible; if the members 19—22 were movable to the complete vertical and horizontal positions, this would require a substantially larger area.

The vertical component of each of the members 19—22 acts through its pivotal connection on the mass 15 to produce the component due to linear acceleration. This vertical component decreases as the members 19—22 are moved toward their horizontal position. The vertical mass moment of inertia component is created by the members 19—22 being positioned other than in a vertical position and increases as the members 19—22 are moved toward their horizontal position. From the vertical position to the horizontal position, the component due to linear acceleration decreases more rapidly than the vertical component due to mass moment of inertia increases because the mass moment of inertia is deliberately retained at a small value for a given mass member. As a result, for example, the link 39 for the member 19 has its lower end, which is pivotally connected to the arm 38 of the bellcrank 35, held stationary although pivotal. Thus, as the stud 25 moves vertically upward with the main mass 15, there is an angular acceleration of the member 19 about its pivotal connection to the link 39. This is due to the stud 25 moving the lower end of the connecting portion 24 of the member 19 vertically with the main mass 15.

The exact amount of movement required of the members 19—22 may be determined by any suitable means. For example, the acceleration of the body 10 could be determined from an accelerometer attached thereto and the acceleration of the absorber could be determined by attaching an accelerometer to the mass 15. The frequencies of the vibrations of the body 10 and the absorber are derived from their accelerations. Thus, their accelerations may be calibrated in frequencies. The frequencies would then be compared, and a switch appropriately operated to energize the actuator 30 to move the rod 32 in the required direction to position the members 19—22 to tune the frequency of the absorber to equal the frequency of the vibrations produced by the body 10. Movement of the rod 32 would cease at this time.

The minimum effective mass of the members 19—22 on the absorber is when the members 19—22 have been moved to the position of FIG. 3 for the members 19 and 20. The highest frequency of vibrations created by the body 10 that can be absorbed by the absorber, which utilizes the tuning device of the present invention, is with the members 19—22 in the position of FIG. 3.

Accordingly, the tuning device of the present invention permits a vibration absorber to be effectively utilized over a large range of frequencies of vibrations. Thus, a vibration absorber which uses the tuning device of the present invention is not limited to a specific frequency of vibration.

Figure 5:
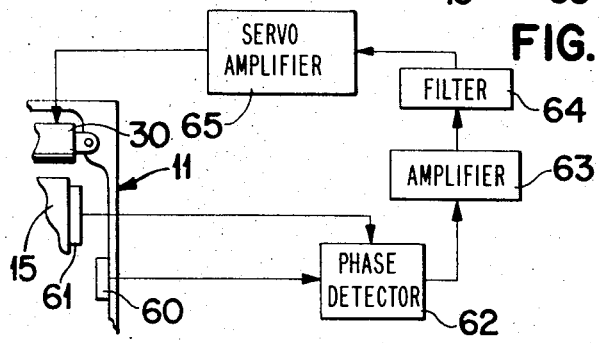
FIG. 5 is a schematic view of a circuit diagram for automatically tuning the absorber to the frequency of the vibration.

As shown in FIG. 5, an automatic control system for the members 19—22 may be employed. This automatic control system would include an accelerometer 60, which would be secured to the casing 11. A second accelerometer 61 would be secured to the mass 15. Accordingly, signals from the accelerometers 60 and 61 would be supplied to a phase detector 62. The signal from the accelerometer 60 would be proportional to the frequency created by the vibrations of the body 10 while the signal from the accelerometer 61 would be proportional to the natural frequency of the absorber. When these two signals are equal, the frequencies of the vibrations created by the body 10 and the natural frequency of the absorber are equal. At this time, the absorber is tuned to the frequency of the vibrations of the body 10.

The phase detector 62 supplies an output that is proportional to the difference of the signals from the accelerometers 60 and 61 and its polarity depends upon whether the larger signal to the detector 62 is from the accelerometer 60 or from the accelerometer 61. The output voltage of the phase detector 62 is supplied through a digital gain stage amplifier 63 and a filter 64 to a servoamplifier 65. The servoamplifier 65 is connected to the actuator 30.

Thus, the servoamplifier 65 appropriately controls the actuator 30 to either extend or retract the rod 32 in accordance with the frequency of the vibrations of the body 10 in comparison with the frequency of the absorber. If the frequency of the vibrations created by the body 10 are greater than the frequency of the absorber, the members 19—22 would be moved toward each other to reduce the effective mass of the absorber. If the frequency of the vibrations created by the body 10 are less than the vibrations of the absorber, then the rod 32 of the actuator 30 is retracted to return the members 19—22 toward the position of FIGS. 1 and 2. This causes an increase in the effective mass of the absorber which decreases the frequency of the absorber so that it becomes equal to the frequency of the vibrations of the body 10.

The accelerometers 60 and 61 may be any suitable accelerometers such as the accelerometer sold by Pickering Company of Plainview, New Jersey as Model No. 7331-D. The phase detector 62, the digital gain stage amplifier 63, the filter 64, and the servoamplifier 65 are available as a complete plug-in unit from General Precision, Inc. of Little Falls, New Jersey as Model C-704888001.

While the mass 15 has been shown as having a rectangular shape, it should be understood that it may have any shape as long as the members 19—22 may be symmetrically attached thereto on opposite sides thereof. However, the shape of the members 19—22 should be configured to provide a relatively low mass moment of inertia. Thus, the members 19—22 are preferably solid cylinders or spheres since this configuration provides a low mass moment of inertia.

An advantage of this invention is that it does not require a substantially large space beyond that required for the absorber. Another advantage of this invention is that it requires only a change in the position of the mass of the tuning device and no change in the spring rate whereby only one of the two controlling parameters of the frequency of the absorber has to be changed.

While a tuning device consisting of a plurality of tuning masses has been described, a single tuning mass can be utilized if the system is such as to compensate for lateral movements and forces on the absorber structure.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A self-tuning vibration absorber adapted to absorb vibrations of varying frequencies, said absorber comprising: support means adapted to be secured to a vibration source; a main mass and supplementary mass means; means to resiliently support said main mass on said support means for movement in one plane to absorb vibrations along said plane; first means pivotally connecting said supplementary mass means directly to said support means; second means pivotally connecting said supplementary mass means to said main mass; and means to change the position of said supplementary mass means with respect to said main mass to change the effective mass of said vibration absorber, said changing means positioning said supplementary mass means with respect to said main mass so that the natural frequency of said vibration absorber is equal to the frequency of the vibration to be absorbed.

2. The absorber according to claim 1 including means to prevent movement of said supplementary mass changing means when said main mass moves in response to a vibration.

3. The absorber according to claim 1 in which said supplementary mass means comprises mass means symmetrically disposed on opposite sides of said main mass and said connecting means comprises separate means to pivotally connect each of said mass means to said main mass.

4. The absorber according to claim 3 including means to simultaneously move all of said supplementary mass means.

5. The absorber according to claim 4 comprising means to determine the difference between the frequency of said absorber and the frequency of the vibration to be absorbed, and means responsive to a signal from said determining means to actuate said simultaneous moving means.

6. A self-tuning vibration absorber for absorbing vibrations of varying frequencies comprising support means, mass means to absorb the vibrations, said mass means including first and second mass means, means to resiliently mount said first mass means on said support means for movement in only one plane to absorb vibrations along only the one plane, said second mass means including four separate members, first means to pivotally connect each of said members directly to said support means and second means to pivotally connect each of said members to said first mass means, said first and second connecting means connecting two of said members to one side of said first mass means and the other two of said members to the opposite side of said first mass means, and means to simultaneously move said members relative to said first mass means to change the effective mass of said absorber.

7. The absorber according to claim 4 wherein said member moving means includes linkage means connected to each of said members and to said support means.

8. The absorber according to claim 7 in which said moving means comprises an actuating member, means pivotally connecting said actuating member to said support means, a first of said linkage means connecting one of said separate members to said support means, means to connect said actuating member to said first linkage means, a second of said linkage means connecting the other of said separate members on the same side of said first mass means to said support means, means to connect said first linkage means to said second linkage means whereby said first linkage means and said second linkage means move together, a third of said linkage means connecting one of said members on the opposite side of said first mass means to said support means, means to connect said first linkage means to said third linkage means whereby said first linkage means and said third linkage means move together, a fourth of said linkage means connecting the other of said members on the opposite side of said first mass means to said support means, and means to connect said second linkage means to said fourth linkage means whereby said second linkage means and said fourth linkage means move together.